(12) United States Patent
Sun et al.

(10) Patent No.: US 9,064,476 B2
(45) Date of Patent: Jun. 23, 2015

(54) IMAGE SUPER-RESOLUTION USING GRADIENT PROFILE PRIOR

(75) Inventors: Jian Sun, Beijing (CN); Heung-Yeung Shum, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1161 days.

(21) Appl. No.: 12/245,712

(22) Filed: Oct. 4, 2008

(65) Prior Publication Data

US 2010/0086227 A1 Apr. 8, 2010

(51) Int. Cl.
*G06K 9/32* (2006.01)
*G09G 5/391* (2006.01)
*G06T 3/40* (2006.01)

(52) U.S. Cl.
CPC .............. *G09G 5/391* (2013.01); *G06T 3/4053* (2013.01); *G09G 2340/0407* (2013.01)

(58) Field of Classification Search
CPC .............................. G06T 5/003; G06T 3/4053
USPC .......................... 382/299, 176, 148, 300, 263
See application file for complete search history.

(56) References Cited

U.S. PATENT DOCUMENTS

| | | | |
|---|---|---|---|
| 5,581,306 A * | 12/1996 | Ohara | 348/625 |
| 5,917,963 A * | 6/1999 | Miyake | 382/300 |
| 6,879,735 B1 * | 4/2005 | Portniaguine et al. | 382/275 |
| 7,106,914 B2 | 9/2006 | Tipping et al. | |
| 7,231,072 B2 * | 6/2007 | Yamano et al. | 382/128 |
| 7,379,612 B2 | 5/2008 | Milanfar et al. | |
| 7,742,011 B2 * | 6/2010 | Damera-Venkata et al. | 345/1.3 |
| 8,335,403 B2 * | 12/2012 | Dai et al. | 382/299 |
| 2005/0220355 A1 | 10/2005 | Sun et al. | |
| 2006/0072844 A1 | 4/2006 | Wang et al. | |
| 2006/0159369 A1 | 7/2006 | Young | |
| 2007/0019887 A1 | 1/2007 | Nestares et al. | |
| 2007/0047838 A1 | 3/2007 | Milanfar et al. | |
| 2007/0083114 A1 * | 4/2007 | Yang et al. | 600/437 |

(Continued)

OTHER PUBLICATIONS

Sun et al., Image Super-Resolution using Gradient Profile Prior, Jun. 23-28, 2008, IEEE Conference on Computer Vision and Pattern Recognition, eight pages total.*

(Continued)

*Primary Examiner* — Matthew Bella
*Assistant Examiner* — Dennis Rosario
(74) *Attorney, Agent, or Firm* — Miia Sula; Judy Yee; Micky Minhas (57) ABSTRACT

Described is a technology by which a low-resolution image is processed into a high-resolution image, including by performing processing in the gradient domain. A gradient profile corresponding to the lower-resolution image is transform into a sharpened image gradient. A high-resolution gradient profile is estimated from a low-resolution gradient profile, e.g., by multiplying the low-resolution gradient profile by a transform ratio that is based upon learned shape parameters, learned sharpness values and a curve distance to an edge pixel along the gradient profile. The transform ratio is used to transform a low-resolution gradient field to a high-resolution gradient field. Reconstructing the higher-resolution image is performed by using the high-resolution gradient field as a gradient domain constraint, e.g., in along with a reconstruction constraint obtained from image domain data. An energy function is minimized by enforcing the gradient domain constraint and the reconstruction constraint, e.g., by performing a gradient descent algorithm.

20 Claims, 5 Drawing Sheets

(56) References Cited

U.S. PATENT DOCUMENTS

| | | | |
|---|---|---|---|
| 2007/0103595 A1* | 5/2007 | Gong et al. | 348/620 |
| 2007/0217713 A1 | 9/2007 | Milanfar et al. | |
| 2010/0091127 A1* | 4/2010 | Hampton et al. | 348/222.1 |

OTHER PUBLICATIONS

Schubert et al., Combining High-Resolution Images With Low-Quality Videos, Proceedings of the British Machine Vision Conference 2008 [on-line], Sep. 2008 [retrieved on Feb. 22, 2012], 10 pages total. Retrieved from the Internet: http://www.bmva.org/bmvc/2008/contents.html.*

Tappen et al., Exploiting the Sparse Derivative Prior for Super-Resolution and Image Demosaicing, Internet Archive: Wayback Machine [on-line], Dec. 24, 2006 [retrieved on Feb. 22, 2012], pp. 1-24. Retrieved from the Internet:http://web.archive.org/web/20061224122237/http://www.cs.ucf.edu/~mtappen/.*

Baker et al., Limits on Super-Resolution and How to Break Them, IEEE Transactions on Pattern Analysis and Machine Intelligence [on-line], Sep. 2002 [retrieved on Feb. 22, 2012], vol. 24, No. 9, pp. 1167-1183. Retrieved on the Internet:http://ieeexplore.ieee.org/xpls/abs_all.jsp?arnumber=1033210&tag=1.*

Dai et al., Soft Edge Smoothness Prior for Alpha Channel Super Resolution [on-line], Jun. 17-22, 2007 [retrieved on Nov. 5, 2013], IEEE Conference on Computer Vision and Pattern Recognition, 2007, 8 total pages. Retrieved from the Internet: http://ieeexplore.ieee.org/xpls/abs_all.jsp?arnumber=4270053.*

Gribble et al., Integrating Vision and Spatial Reasoning for Assistive Navigation [on-line], 1998 [retrieved Nov. 5, 2013], Assistive Technology and Artificial Intelligence Lecture Notes in Computer Science, vol. 1458, pp. 179-193. Retrieved from the Internet: http://link.springer.com/chapter/10.1007/BFb0055978#.*

Kim, et al., "Example-based Learning for Single-Image Super-resolution", DAGM-Symposium, 2008, pp. 456-465.

Connolly, et al, "Gradient methods for Superresolution", Proceedings of International Conference on Image Processing, 1997, vol. 1, Issue , Oct. 26-29, 1997, pp. 917-920.

Liu, et al., "MAP-Based Image Super-Resolution Reconstruction", International Journal of Computer Science and Engineering vol. 2 No. 3, 2007, pp. 125-128.

Aly, et al., "Image Up-Sampling Using Total-Variation Regularization With a New Observation Model", IEEE Transactions on Image Processing, vol. 14, No. 10, Oct. 2005, pp. 1647-1659.

Baker, et al., "Limits on Super-Resolution and How to Break Them", IEEE Transactions on Pattern Analysis and Machine Intelligence, vol. 24, Issue 9, Sep. 2002, pp. 1167-1183.

Ben-Ezra, et al., "Penrose Pixels: Super-Resolution in the Detector Layout Domain", IEEE 11th International Conference on Computer Vision, 2007. ICCV 2007, Publication Date: Oct. 14-21, 2007, 8 pages.

Buades, et al., "A non-local algorithm for image denoising", IEEE Computer Society Conference on Computer Vision and Pattern Recognition, 2005. CVPR 2005, Publication Date: Jun. 20-25, 2005, vol. 2, pp. 60-65.

Chang, et al., "Super-Resolution Through Neighbor Embedding", Proceedings of the 2004 IEEE Computer Society Conference on Computer Vision and Pattern Recognition, CVPR 2004, Jun. 27-Jul. 2, 2004, vol. 1, pp. I-275-I-282.

Dai, et al., "Soft Edge Smoothness Prior for Alpha Channel Super Resolution", In CVPR, 2007, 8 pages.

Raanan Fattal, "Image Upsampling via Imposed Edge Statistics", ACM Transactions on Graphics (TOG), vol. 26, Issue 3, Jul. 2007, 8 pages.

Fergus, et al., "Removing Camera Shake from a Single Photograph" ACM Transactions on Graphics (TOG), vol. 25, Issue 3, Jul. 2006, pp. 787-794.

Freeman, et al., "Example-Based Super-Resolution", IEEE Computer Graphics and Applications ,vol. 22, No. 2, Mar./Apr. 2002, pp. 56-65.

Freeman, et al., "Learning Low-Level Vision", International Journal of Computer Vision 40(1), 2000, pp. 25-47.

Hardie, et al., "Joint MAP Registration and High-Resolution Image Estimation Using a Sequence of Undersampled Images", IEEE Transactions on Image Processing, vol. 6, No. 12, Dec. 1997, pp. 1621-1633.

Hou, et al., "Cubic Splines for image Interpolation and Digital Filtering", IEEE Transactions on Acoustics, Speech, and Signal Processing, vol. ASSP-26, No. 6, Dec. 1978, pp. 508-517.

Huang, et al., "Statistics of Natural Images and Models" IEEE Computer Society Conference on Computer Vision and Pattern Recognition, 1999, vol. 1, 7 pages.

Irani, et al., "Motion Analysis for Image Enhancement: Resolution, Occlusion, and Transparency", Journal of Visual Communication and Image Representation,1993, vol. 4, 24 pages.

Levin, et al., "Image and Depth from a Conventional Camera with a Coded Aperture", ACM Transactions on Graphics, vol. 26, No. 3, 2007, 9 pages.

Levin, et al., "Seamless Image Stitching in the Gradient Domain", in Eighth European Conference on Computer Vision (ECCV 2004}, 2004, 12 pages.

Levin, et al., "Learning How to Inpaint from Global Image Statistics", Ninth IEEE International Conference on Computer Vision (ICCV'03)—vol. 1, 2003, 8 pages.

Li, et al., "New Edge-Directed Interpolation", IEEE Transactions on Image Processing, vol. 10, No. 10, Oct. 2001, pp. 1521-1527.

Lin, et al., "Fundamental Limits of Reconstruction-Based Super-resolution Algorithms under Local Translation", IEEE Transactions on Pattern Analysis and Machine Intelligence, vol. 26, No. 1, Jan. 2004, 15 pages.

Liu, et al., "Face Hallucination: Theory and Practice", International Journal of Computer Vision, vol. 75, No. 1, Oct. 2007, 34 pages.

Morse, et al., "Image Magnification Using Level-Set Reconstruction", Proceedings of the 2001 IEEE Computer Society Conference onComputer Vision and Pattern Recognition, 2001, CVPR 2001, vol. 1, pp. I-333-I-340.

Rabaud, et al., "Big Little Icons", Proceedings of the 2005 IEEE Computer Society Conference on Computer Vision and Pattern Recognition (CVPR'05), 2005, 7 pages.

Roth, et al., Fields of Experts: A Framework for Learning Image Priors, IEEE Computer Society Conference on Computer Vision and Pattern Recognition, 2005, CVPR 2005, Publication Date: Jun. 20-25, 2005, vol. 2, 8 pages.

Roth, et al., "Steerable Random Fields", IEEE 11th International Conference on Computer Vision, 2007, ICCV 2007, Oct. 14-21, 2007, 8 pages.

Schultz, et al., "Extraction of High-Resolution Frames from Video Sequences", IEEE Transactions on Image Processing, Jun. 1996, vol. 5, Issue: 6, 4 pages.

Sun, et al., "Image Hallucination with Primal Sketch Priors", Proceedings of the IEEE Conference on Computer Vision and Pattern Recognition (CVPR}, 2003, pp. 729-736.

Tai, et al., "Perceptually-Inspired and Edge-Directed Color Image Super-Resolution", Proceedings of the 2006 IEEE Computer Society Conference on Computer Vision and Pattern Recognition (CVPR'06), 2006, 8 pages.

Tappen, et al., "Exploiting the Sparse Derivative Prior for Super-Resolution and Image Demosaicing", In SCTV, 2003, 28 pages.

Thevenaz, et al., "Image Interpolation and Resampling", Handbook of medical imaging book contents, 2000, 39 pages.

Wang, et al., "Patch Based Blind Image Super Resolution", Proceedings of the Tenth IEEE International Conference on Computer Vision (ICCV'05), 2005, 8 Pages.

* cited by examiner

IMAGE SUPER-RESOLUTION USING GRADIENT PROFILE PRIOR

BACKGROUND

Image super-resolution is directed to estimating a high-resolution (high-resolution) image from low-resolution (low-resolution) input. There are mainly three categories of approach for this problem, namely interpolation-based methods, reconstruction-based methods, and learning-based methods.

Interpolation-based methods are simple but tend to blur the high frequency details. Reconstruction-based methods enforce a reconstruction constraint, which requires that the smoothed and down-sampled version of the high-resolution image need to be close to the low-resolution image. Learning-based methods "hallucinate" high frequency details from a training set of high-resolution/low-resolution image pairs. The learning-based approach relies to a significant extent on the similarity between the training set and the test set. It is not clear how many training examples are sufficient for generic images.

To design a good image super-resolution algorithm, a significant issue is how to apply a good prior or constraint on the high-resolution image. Any improvement in image super-resolution technology is beneficial.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a low-resolution image is processed into a high-resolution image, including by performing processing in the gradient domain. In one aspect, a gradient profile corresponding to the lower-resolution image is transform into a sharpened image gradient. The higher-resolution image is reconstructed based upon the sharpened image gradient.

In one aspect, a high-resolution gradient profile is estimated from a low-resolution gradient profile, e.g., by multiplying the low-resolution gradient profile by a transform ratio that is based upon learned shape parameters, learned sharpness values and a curve distance to an edge pixel along the gradient profile. The transform ratio is used to transform a low-resolution gradient field to a high-resolution gradient field. Reconstructing the higher-resolution image is performed by using the high-resolution gradient field as a gradient domain constraint, e.g., in along with a reconstruction constraint obtained from image domain data. An energy function is minimized by enforcing the gradient domain constraint and the reconstruction constraint, e.g., by performing a gradient descent algorithm.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards processing a low-resolution image into a high-resolution image, including by performing processing in the gradient domain. To this end, there is described a generic image prior, namely a gradient profile prior for the gradient field of the natural image. The gradient profile is a one-dimensional profile along the gradient direction of the zero-crossing pixel in the image. The gradient profile prior is a parametric distribution describing the shape and the sharpness of the gradient profiles in natural image.

As will be understood, one advantage of the gradient profile prior is that, unlike the previous generic smoothness prior and edge smoothness prior, the gradient profile prior is not a smoothness constraint. As a result, both small scale and large scale details are well recovered in the high-resolution image. Another advantage is that common artifacts in super-resolution, such as ringing artifacts, can be avoided by working in the gradient domain.

It is understood that any examples used herein are only examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

Figure 1:
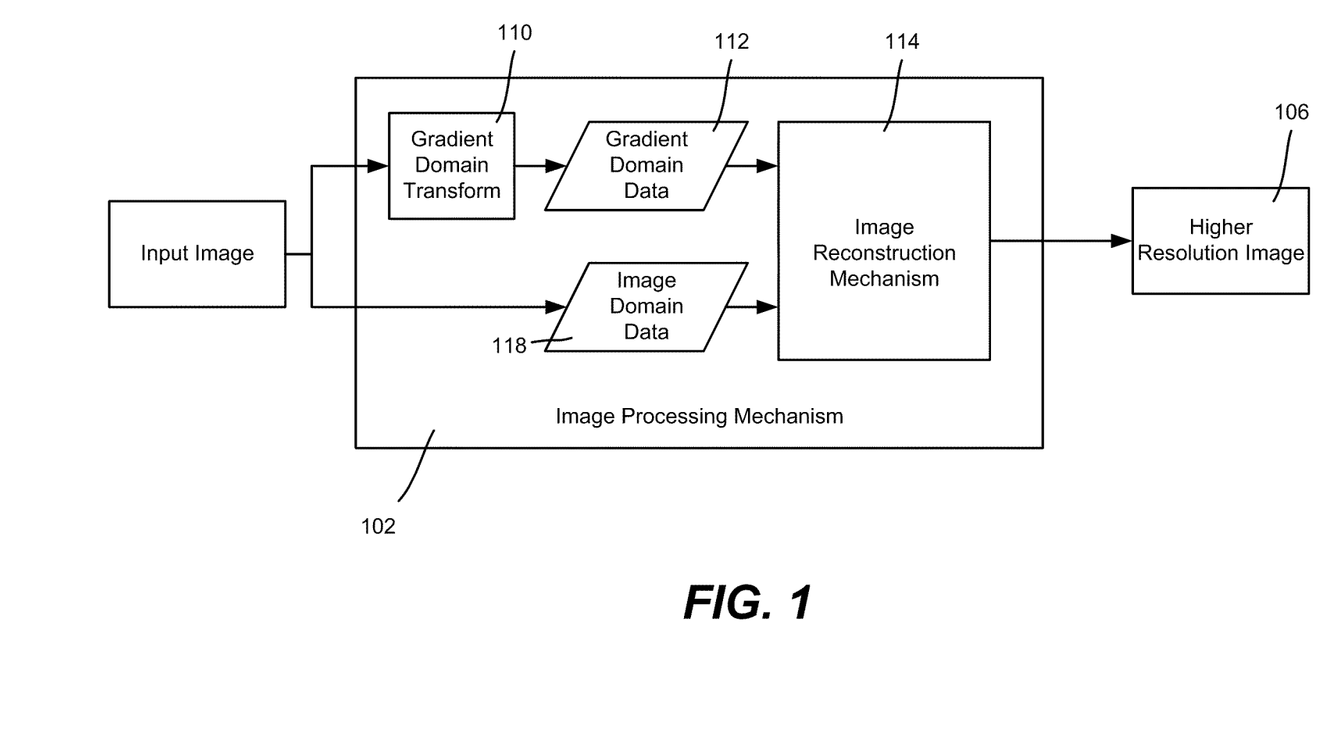
FIG. 1 is a block diagram showing example components for processing a lower resolution image into a higher-resolution image via gradient data processing.

Turning to FIG. 1, there is shown an image processing mechanism 102 that processes a low-resolution image 104 into a high-resolution image 106. To this end, the image processing mechanism 102 uses a gradient domain transformation mechanism 110 to obtain gradient-related image data 112 (in the gradient domain) as described below. As described below, an image reconstruction mechanism 114 reconstructs the high-resolution image 106 based on the gradient domain data 112 (including a gradient constraint) and image domain data 118 (including a reconstruction constraint), essentially by shrinking the gradient profile/image via minimizing an energy function. Gradient reconstruction is performed by solving Poisson equations on the transformed gradient field.

One observation is that the shape statistics of the gradient profiles in a natural image are stable and invariant to the image resolution. With such stable statistics, the statistical relationship of the sharpness of the gradient profile between the high-resolution image and the low-resolution image can be learned. Using the gradient profile prior and the statistical relationship, a constraint is provided on the gradient field of the high-resolution image. When combined with a reconstruction constraint, high-quality high-resolution image results.

A gradient profile prior is a parametric prior describing the shape and the sharpness of image gradients. Using the gradient profile prior learned from a large number of natural images, a constraint can be provided on image gradients when estimating a high-resolution image from a low-resolution image. The reconstructed high-resolution image is sharp, with relatively rare ringing or jaggy artifacts.

In general, unlike previous natural image statistics which characterize the marginal distribution of the image gradients over an entire image and discards the spatial information, the technology described herein leverages the image gradients along local image structures and the statistical dependency of the image gradients between the high-resolution image and the low-resolution image. To describe a gradient profile and its sharpness, the image gradient may be denoted as $\nabla I = m \cdot \vec{N}$, where m is the gradient magnitude and $\vec{N}$ is the gradient direction. In the gradient field, the zero crossing pixel, which is the local maximum on its gradient direction, is denoted as an edge pixel.

Figure 2A:
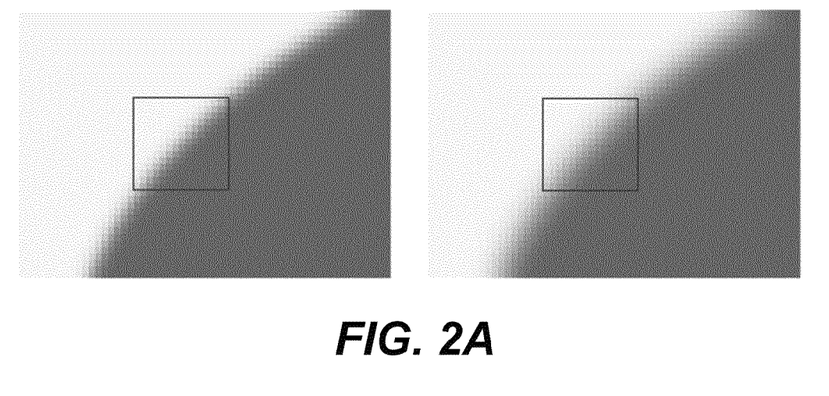
FIGS. 2A-2C are representations of obtaining gradient profile data from images.
Figure 2B:
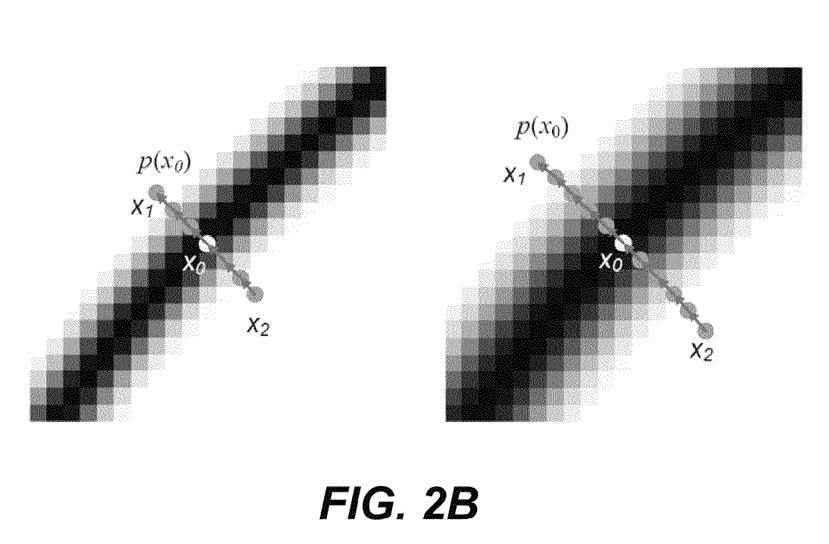
Figure 2C:
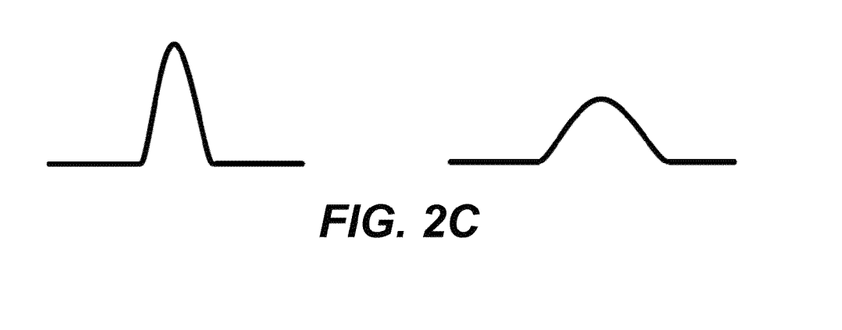

FIG. 2A shows two image blocks containing two edges with different sharpness. FIG. 2B shows corresponding gradient (magnitude) maps. The pixel x0 in FIG. 2B is a zero crossing, or edge pixel. Starting from x0, a path may be traced along the gradient directions (two-sides) pixel by pixel until the gradient magnitude no longer decreases. The 1-D path p(x0) is called the gradient profile. FIG. 1C shows one-dimensional curves of two gradient profiles.

The sharpness of the gradient is measured profile using the square root of the variance (second moment):

$$\sigma(p(x_0)) = \sqrt{\sum_{x \in p(x_0)} m'(x) d^2(x, x_0)} \quad (1)$$

where $$m'(x) = \frac{m(x)}{\sum_{s \in p(x_0)} m(s)}$$

and $d(x, x_0)$ is the curve length of the gradient profile between x and $x_0$. The sharper the image gradient profile, the smaller the variance σ is; this variance is called the profile sharpness.

Individually estimating the sharpness for each gradient profile is not robust due to noise. A better estimation is provided by applying a global optimization to enforce the consistency of neighboring profiles as follows.

First, a graph is constructed on all edge pixels. The graph node is the edge pixel and the graph edge is the connection between two neighboring edge pixels within a pre-defined distance (e.g., five pixels). The edge weight $w_{ij}$ for each clique of two connected nodes i and j is defined as, $$w_{i,j} = \exp(-\zeta_1 \cdot |\nabla u_i - \nabla u_j|^2 - \zeta_2 \cdot d(i,j)^2), \quad (2)$$

where the first term in the exponent is the gradient similarity, and the second term is Euclidean distance between i and j. For each node i, the process individually estimates its sharpness $\hat{\sigma}_i$ using Equation (1).

Then, the energy is minimized to estimate the sharpness of all edge pixels:

$$E(\{\sigma_i\}) = \sum_i \left[ (\sigma_i - \hat{\sigma}_i)^2 + \gamma \cdot \sum_{j \in N(i)} w_{i,j} \cdot (\sigma_i - \sigma_j)^2 \right], \quad (3)$$

where N(i) are neighboring nodes of the node i. This energy can be effectively minimized because it is a Gaussian MRF model; in one implementation, $\gamma=5$, $\zeta_1=0.15$, and $\zeta_2=0.08$.

The regularity of the gradient profiles in a natural image is investigated, to fit the distribution of the gradient profile by a general exponential family distribution, e.g., a Generalized Gaussian Distribution (GGD), which is defined as:

$$g(x; \sigma, \lambda) = \frac{\lambda \alpha(\lambda)}{2\sigma \Gamma\left(\frac{1}{\lambda}\right)} \exp\left\{-\left[\alpha(\lambda) \left|\frac{x}{\sigma}\right|\right]^\lambda\right\}, \quad (4)$$

where $\Gamma(\cdot)$ is the gamma function and $$\alpha(\lambda) = \sqrt{\Gamma\left(\frac{3}{\lambda}\right) / \Gamma\left(\frac{1}{\lambda}\right)}$$

is the scaling factor that makes the second moment of GGD equal to $\sigma^2$. Therefore, σ can be directly estimated using the second moment of the profile. The shape parameter is λ, which controls the overall shape of the distribution.

The distribution $g(x; \sigma, \lambda)$ is a Gaussian distribution when $\lambda=2$, or a Laplacian distribution if $\lambda=1$. Using an original image set from which a data set $\Omega_1$ of gradient profiles is selected, and with data sets $\Omega_2$, $\Omega_3$ and $\Omega_4$ corresponding to down-sampled versions of the original resolution images with down-sampling factors of 2, 3, and 4, respectively, an optimal $\lambda^*$ is estimated using Kullback-Leibler (KL) divergence to measure the fitting error, by:

$$\lambda^* = \operatorname{argmin}_\lambda \left\{ \sum_{p \in \Omega} KL(p, g(\cdot; \sigma_p, \lambda)) \right\}, \quad (5)$$

where $\sigma_p$ is the variance (estimated using Equation (3)) of p, which is one profile in the set. The average KL divergences on four profile sets Ω1, Ω2, Ω3 and Ω4 is computed by varying the shape parameter λ; one optimal shape parameter is about 1.6 for all down-sampling factors. The shape parameter λ is stable across different resolutions, which means that the gradient profile distribution is resolution-independent in a natural image.

For each gradient profile in the up-sampled image $I_l^u$, the process extracts its corresponding gradient profile in the high-resolution image $I_h$. Because the edge pixels are not exactly aligned in two images, the best matched edge pixels are found by measuring the distance and direction. For each edge pixel el in $I_l^u$, the best matched edge pixel eh in $I_h$ is found by:

$$e_h = \operatorname{argmin}_{e \in N(e_l)} \{\|e - e_l\| + 2\|\vec{N}(e) - \vec{N}(e_l)\|\} \quad (6)$$

where $N(e_l)$ represents the 5×5 neighbors of $e_l$ in the high-resolution image.

To compute the statistics, the sharpness σ is quantized into bins, e.g., with the width of bin being 0.1. For low-resolution gradient profiles whose sharpness value falls in the same bin, the expectation of sharpness of the corresponding high-resolution gradient profiles is calculated.

The high-resolution gradient profile is sharper than the low-resolution gradient profile because bicubic interpolation blurs the profile; the higher the up-sampling factor, the larger the sharpness difference between the high-resolution gradient profile and the low-resolution gradient profile.

Turning to applying the gradient profile prior image super-resolution, given a low-resolution image (step 302 of FIG. 3), the gradient profile prior can provide constraints on the gradient field of the high-resolution image, namely that the shape parameter of gradient profiles in the high-resolution image is close to the value 1.6, and that the sharpness relationship of gradient profiles between two resolutions follows the learned statistical dependency in the previous section. The higher-resolution image may be reconstructed by enforcing these constraints, as described below.

More particularly, described herein is a gradient field transformation approach to approximate the high-resolution gradient field by first transforming the low-resolution gradient field using the gradient profile prior. To transform a gradient profile $p_l=\{\lambda_l,\sigma_l\}$ in the up-sampled image $I_l^u$ to a gradient profile $p_h=\{\lambda_h,\lambda_h\}$ in the high-resolution image $I_h$, as represented by example step 304 of FIG. 3 the ratio between two gradient profiles is computed:

$$r(d) = \frac{g(d;\sigma_h,\lambda_h)}{g(d;\sigma_l,\lambda_l)} \quad (7)$$

$$= c \cdot \exp\left\{-\left(\frac{\alpha(\lambda_h)\cdot|d|}{\sigma_h}\right)^{\lambda_h} + \left(\frac{\alpha(\lambda_l)\cdot|d|}{\sigma_l}\right)^{\lambda_l}\right\},$$

where $$c = \frac{\lambda_h \cdot \alpha(\lambda_h) \cdot \sigma_l \cdot \Gamma(1/\lambda_l)}{\lambda_l \cdot \alpha(\lambda_l) \cdot \sigma_h \cdot \Gamma(1/\lambda_h)}$$

and d is the curve distance to the edge pixel along the gradient profile. Thus, the high-resolution gradient profile $p_h$ can be estimated by multiplying low-resolution gradient profile $p_l$ by the transform ratio. The shape parameters $\lambda_h$ and $\lambda_l$ are set to the learned values as described above; the sharpness $\sigma_l$ is estimated from the image $I_l^u$ and the sharpness $\sigma_h$ is set as the expected value of $\sigma_l$ using the learned relationship as described above.

Next, using the ratio computed in equation (7), the low-resolution gradient field $\nabla I_l^u$ is transformed (step 306 of FIG. 3) to the high-resolution gradient field $\nabla I_h^T$ by:

$$\nabla I_h^T(x) = r(d(x,x_0)) \cdot \nabla I_l^u(x), \quad (8)$$

where $x_0$ is the edge pixel of the gradient profile passing through x, and $d(x, x_0)$ is the distance between x and $x_0$ along the gradient profile. In one implementation, to find the gradient profile passing through x, the process traces from x along the direction (gradient direction or minus gradient direction) with increasing gradient magnitude until reach an edge pixel $x_0$ (in a threshold distance, e.g., one pixel), then adjust the gradient of x by equation (8).

Figure 4:
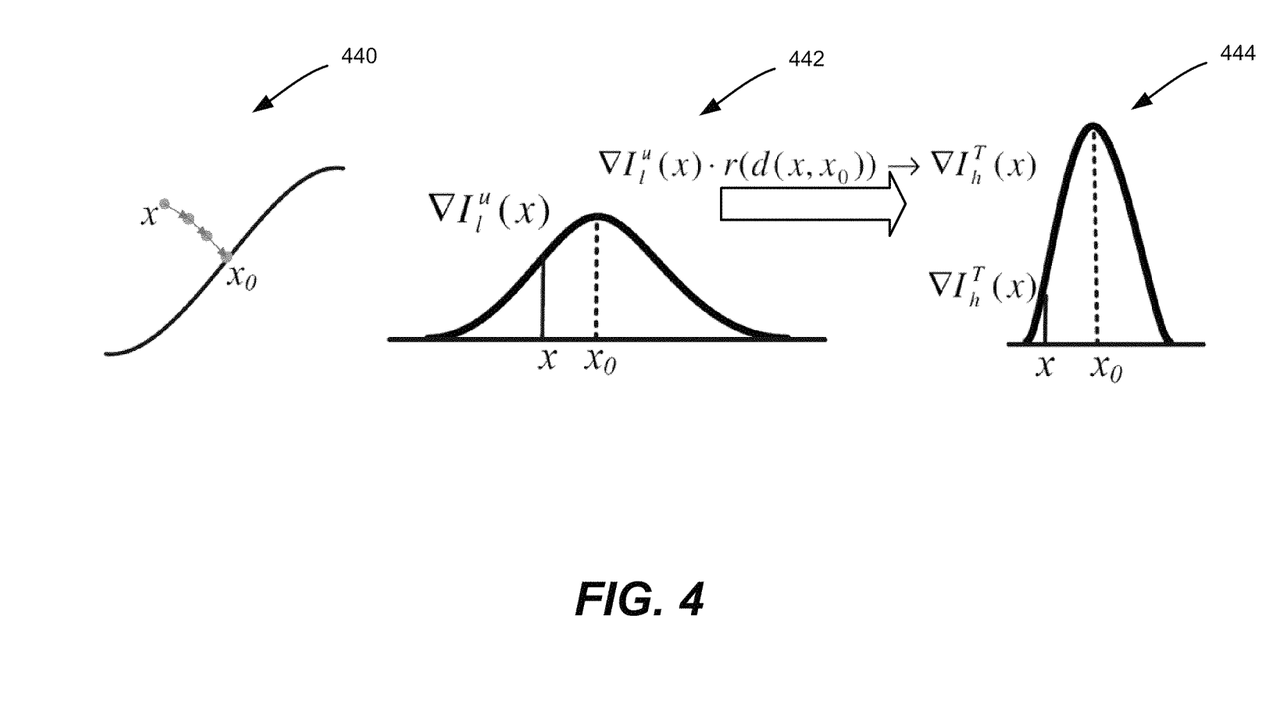
FIG. 4 is a representation of gradient field transformation.

FIG. 4 shows an illustration of gradient transformation, in which the left and center representations 440, 442 illustrate a gradient profile passing through x and $x_0$ in the up-sampled image. The gradient of x is transformed to its high-resolution version (the right representation 444) by multiplying by a ratio $r(d(x,x_0))$.

The transformed gradient field is used as the gradient domain constraint for the high-resolution image reconstruction. Given the low-resolution image $I_l$, in order to reconstruct the high-resolution image $I_h$, the following energy function is minimized (step 308 of FIG. 3) by enforcing the constraints in both image domain and gradient domain:

$$E(I_h|I_l,\nabla I_h^T) = E_i(I_h|I_l) + \uparrow E_g(\nabla I_h|\nabla I_h^T), \quad (9)$$

where $E_i(I_h|I_l)$ is the reconstruction constraint in the image domain and $E_g(\nabla I_h|\nabla I_h^T)$ is the gradient constraint in the gradient domain. The reconstruction constraint measures the difference between the low-resolution image $I_l$ and the smoothed and down-sampled version of high-resolution image $I_h$:

$$E_i(I_h|I_l) = |(I_h*G)\downarrow - I_l|^2. \quad (10)$$

where G is a spatial filter, * is the convolution operator, and $\downarrow$ is the down-sampling operation. A Gaussian filter is used for the spatial filter G. The kernel standard variance is set to 0.8, 1.2 and 1.6 for the up-sampling factors of 2, 3 and 4. The gradient constraint requires that the gradient field of the recovered high-resolution image is to be close to the transformed high-resolution gradient field $\nabla I_h^T$:

$$E_g(\nabla I_h|F) = |\nabla I_h - \nabla I_h^T|^2, \quad (11)$$

where $\nabla I_h$ is the gradient of $I_h$. Using this constraint, the gradient profiles in $I_h$ has a desired statistics as learned from the natural images. The energy function (9) can be minimized by a gradient descent algorithm:

$$I_h^{t+1} = I_h^t - \tau \cdot \frac{\partial E(I_h)}{\partial I_h}, \quad (12)$$

$$\frac{\partial E(I_h)}{\partial I_h} = ((I_h*G)\downarrow - I_l)\uparrow *G - \beta \cdot (\nabla^2 I_h - \nabla^2 I_h^T).$$

where

A global optimum can be obtained because the energy (10) is a quadratic function. The step size $\tau$ is set to 0.2, parameter $\beta = 0.5$ and the up-sampled image $I_l^u$ used as the initial value of $I_h$.

Figure 3:
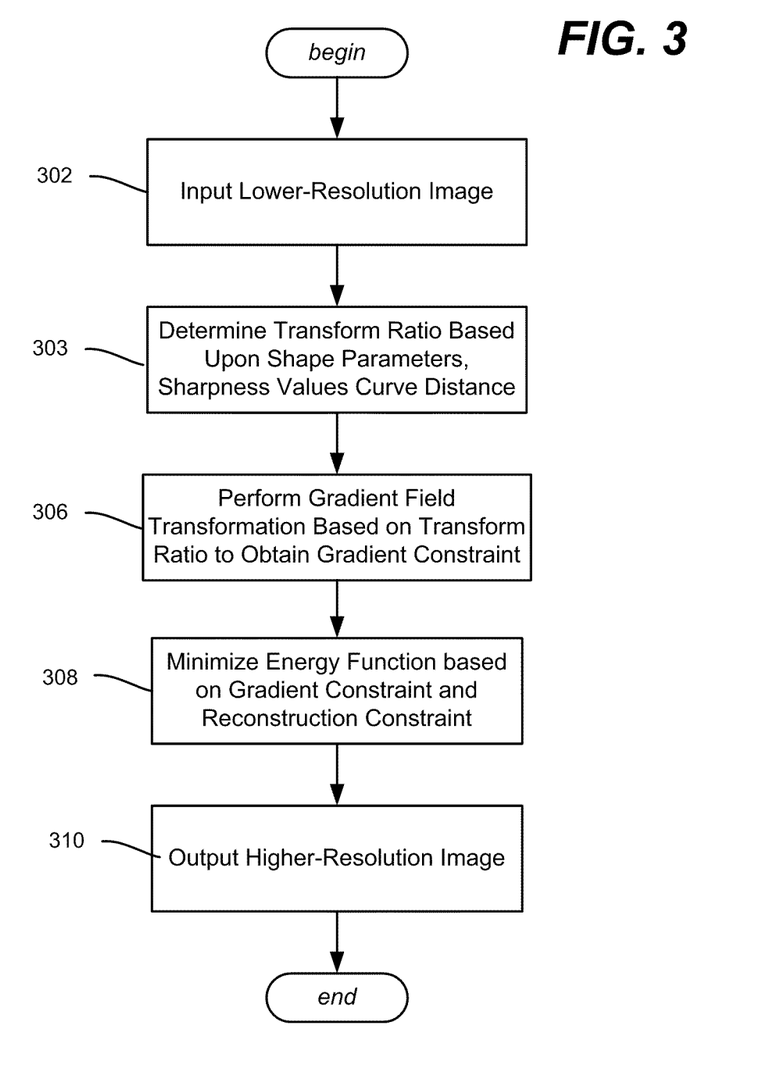
FIG. 3 is a flow diagram showing general steps for reconstructing a higher-resolution image from a lower resolution image via gradient processing.

Note that gradient reconstruction is obtained by solving Poisson equations on the transformed gradient field. Step 310 represents outputting the reconstructed higher-resolution image.

Exemplary Operating Environment

Figure 5:
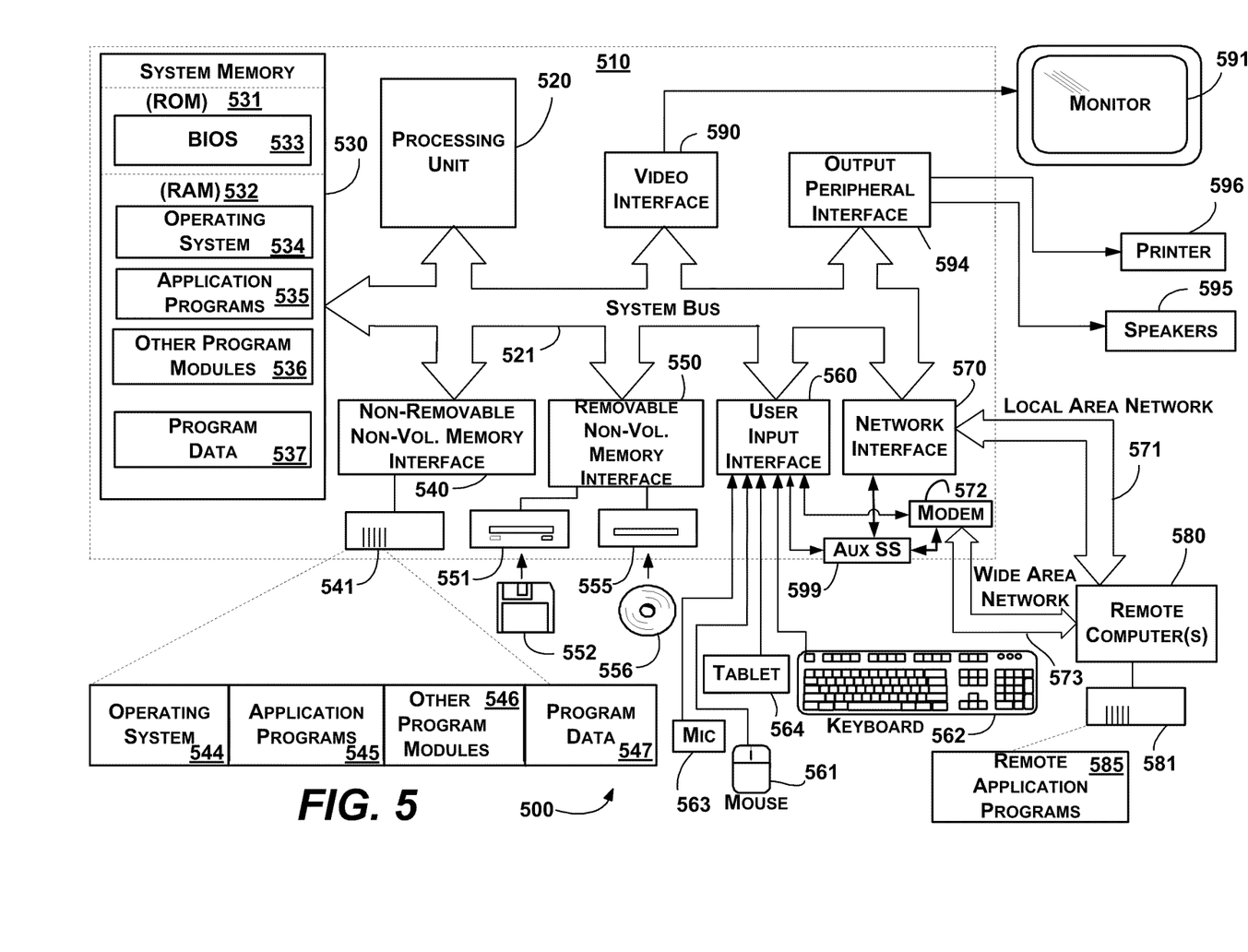
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
processing a lower-resolution image into a higher-resolution image, including by determining a gradient profile corresponding to the lower-resolution image, wherein the gradient profile is a one-dimensional profile along the gradient direction of the zero-crossing pixel;
using a transform ratio and a gradient profile prior to transform the gradient profile into a high-resolution gradient profile, wherein the gradient profile prior is a parametric prior describing shape and sharpness of image gradients, and wherein the gradient profile prior is used to provide constraints on the image gradients in the high-resolution gradient profile; and
reconstructing the higher-resolution image based upon the high-resolution gradient profile, wherein reconstructing the higher-resolution image includes minimizing an energy function by enforcing a gradient domain constraint shape and a reconstruction constraint, using the high-resolution gradient profile as the gradient domain constraint shape.

2. The method of claim 1 wherein transforming the gradient profile into the high-resolution gradient profile comprises multiplying the gradient profile by the transform ratio based upon shape parameters, sharpness values and a curve distance to an edge pixel along the gradient profile.

3. The method of claim 2 further comprising:
learning the shape parameters and sharpness values by analyzing other images.

4. The method of claim 1 further comprising:
identifying a statistical relationship of a sharpness between the gradient profile corresponding to the lower-resolution image and the sharpened image gradient.

5. The method of claim 4, further comprising:
using the statistical relationship as a constraint on the high-resolution gradient field.

6. The method of claim 1 wherein the gradient profile describes the shape and sharpness of image gradients in a natural image, and wherein the gradient profile is invariant to image resolution.

7. The method of claim 1 wherein enforcing the gradient domain constraint and the reconstruction constraint comprises performing a gradient descent algorithm.

8. The method of claim 1 wherein reconstructing the higher-resolution image comprises solving Poisson equations on the sharpened image gradient data.

9. A system configured to sharpen the resolution of an image, the system comprising:
at least one processor;
a memory communicatively coupled to the processor and containing processer-executable instructions;
an image processing component configured to process a lower-resolution image into a higher-resolution image, including by determining a gradient profile corresponding to the lower-resolution image and processing the gradient profile into a sharpened image gradient using a gradient profile prior, wherein the gradient profile prior is a parametric prior describing shape and sharpness of image gradients, and wherein the gradient profile prior is used to provide constraints on the image gradients in the sharpened image gradient; and
an image reconstruction component configured to reconstruct the higher-resolution image based upon the sharpened image gradient and to minimize an energy function by enforcing a gradient domain constraint shape of the sharpened image gradient and a reconstruction constraint on the higher-resolution image.

10. The system of claim 9, further comprising:
a gradient domain data processing component configured to estimate a high-resolution gradient profile from a low-resolution gradient profile.

11. The system of claim 10 wherein the gradient domain data processing component is further configured to multiply the low-resolution gradient profile by a transform ratio based upon shape parameters, sharpness values, and a curve distance to an edge pixel along the gradient profile to estimate the high-resolution gradient profile from the low-resolution gradient profile.

12. The system of claim 11 wherein the gradient domain data processing component is further configured to transform a low-resolution gradient field to a high-resolution gradient field using the transform ratio.

13. The system of claim 12 wherein the image reconstruction component is further configured to reconstruct the higher-resolution image using the high-resolution gradient field as the gradient domain constraint.

14. The system of claim 9 wherein the image reconstruction component is further configured to enforce the gradient domain constraint and the reconstruction constraint by performing a gradient descent algorithm.

15. One or more computer storage devices having computer-executable instructions, which in response to execution by a computer, cause the computer to perform steps, comprising:
processing a lower-resolution image into a higher-resolution image, including by determining a gradient profile corresponding to the lower-resolution image;
processing the gradient profile into a sharpened image gradient using a gradient profile prior and a transform ratio to transform the gradient profile to a high-resolution gradient profile that includes the sharpened image gradient, wherein the gradient profile prior describes the shape and sharpness of image gradients in one or more natural images; and reconstructing the higher-resolution image based upon the sharpened image gradient by enforcing a shape of the sharpened image gradient.

16. The one or more computer storage devices of claim 15 wherein reconstructing the higher-resolution image includes minimizing an energy function by enforcing a gradient domain constraint and a reconstruction constraint, using the high-resolution gradient field as the gradient domain constraint.

17. The one or more computer storage devices of claim 15 wherein enforcing the gradient domain constraint and the reconstruction constraint comprises performing a gradient descent algorithm.

18. The one or more computer storage devices of claim 15 wherein reconstructing the higher-resolution image comprises solving Poisson equations on the sharpened image gradient data.

19. The one or more computer storage devices of claim 15 wherein processing the gradient profile into a sharpened image gradient further comprises:

multiplying the low-resolution gradient profile by the transform ratio based upon shape parameters, sharpness values, and a curve distance to an edge pixel along the gradient profile.

20. The one or more computer storage devices of claim 19 having further computer-executable instructions, comprising:

learning the shape parameters and sharpness values by analyzing other images.

* * * * *